(12) United States Patent
Jin et al.

(10) Patent No.: US 10,146,949 B2
(45) Date of Patent: Dec. 4, 2018

(54) METHOD AND APPARATUS FOR ENCRYPTING AREA OF ELECTRONIC DOCUMENT

(71) Applicant: Samsung Electronics Co., Ltd., Suwon-si, Gyeonggi-do (KR)

(72) Inventors: Seong-hun Jin, Suwon-si (KR); Young-cheol Kang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 14/293,256

(22) Filed: Jun. 2, 2014

(65) Prior Publication Data
US 2016/0117516 A1   Apr. 28, 2016

(30) Foreign Application Priority Data

Aug. 5, 2013   (KR) ........................ 10-2013-0092664

(51) Int. Cl.
*G06F 21/62*   (2013.01)
*G06F 21/30*   (2013.01)
*G06F 3/0483*   (2013.01)
*G06F 3/0488*   (2013.01)

(52) U.S. Cl.
CPC ........ *G06F 21/6209* (2013.01); *G06F 3/0483* (2013.01); *G06F 3/04883* (2013.01); *G06F 21/30* (2013.01)

(58) Field of Classification Search
CPC ................................ G06F 21/10; G06F 21/31
See application file for complete search history.

(56) References Cited

U.S. PATENT DOCUMENTS

| 7,640,513 | B2 | 12/2009 | Card et al. |
| 7,748,633 | B2 | 7/2010 | Hasuike |
| 9,734,132 | B1 * | 8/2017 | Kothandapani Shanmugasundaram .................... G06F 17/30905 |
| 2005/0235163 | A1 | 10/2005 | Forlenza et al. |
| 2007/0055560 | A1 * | 3/2007 | Quinn, Jr. .......... G06Q 10/1053 705/321 |
| 2009/0222724 | A1 * | 9/2009 | Stewart ................... G06T 19/00 715/277 |
| 2010/0119067 | A1 | 5/2010 | Yoshio et al. |

(Continued)

FOREIGN PATENT DOCUMENTS

JP   4957857 B2   3/2012

OTHER PUBLICATIONS

Basu, Saikat, How to Hide Text in Microsoft Word 2007, Reveal It & Protect It, Oct. 17, 2009, retrieved on Jan. 19, 2015 from http://www.makeuseof.com/tag/how-to-hide-text-in-microsoft-word-2007-reveal-it-protect-it/.

*Primary Examiner* — Samson Lemma
*Assistant Examiner* — Arya Golriz
(74) *Attorney, Agent, or Firm* — Jefferson IP Law, LLP

(57) ABSTRACT

A method and apparatus for encrypting an area of an electronic document are provided. The method includes displaying the electronic document, receiving an input signal including information about a first point and a second point of the electronic document, shifting an area adjacent to the first point toward the second point in response to the input signal, displaying only an area of the electronic document other than an encrypted area determined according to a result of the shifting, and enabling a lock mode that maintains a state of displaying the area other than the encrypted area.

20 Claims, 19 Drawing Sheets

(56) References Cited

U.S. PATENT DOCUMENTS

| | | |
|---|---|---|
| 2011/0194127 A1* | 8/2011 | Nagakoshi ........... H04N 1/0044 |
| | | 358/1.9 |
| 2012/0131471 A1 | 5/2012 | Terlouw et al. |
| 2012/0131516 A1 | 5/2012 | Chiu et al. |
| 2012/0327012 A1* | 12/2012 | Hoch ...................... G06F 3/044 |
| | | 345/174 |
| 2013/0076758 A1 | 3/2013 | Li et al. |
| 2013/0104017 A1 | 4/2013 | Ko et al. |
| 2013/0117703 A1 | 5/2013 | Jang et al. |

* cited by examiner

FIG. 9

102. Paul Brown resigned last Monday from his position as ___ executive of the company.
(A) fine
(B) chief
(C) front
(D) large 103. The financial audit of Soft Peach Software ___ completed on Wednesday by a certified accounting frim.
(A) to be
(B) having been
(C) was
(D) were 104. The organizers of the trip reminded participants to ___ at the steps of the city hall at 2:00 P.M.
(A) see
(B) combine
(C) meet
(D) go 105. ___ is no better season the winter to beg Fitness Center
(A) When
(B) It
(C) There
(D) As it

MEMO: MIDDLE SCHOOL ENGLISH UNTIL MAY 15

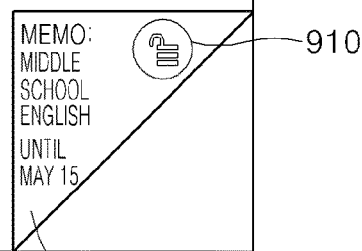

102. Paul Brown resigned last Monday from his position as ___ executive of the company.
(A) fine
(B) chief
(C) front
(D) large 103. The financial audit of Soft Peach Software ___ completed on Wednesday by a certified accounting frim.
(A) to be
(B) having been
(C) was
(D) were Register
[Noun]                                       ~1010
I. an official written record of names or events or transactions
Reference registry                                        ~1000
II. (music) the timbre that is characteristic of a certain range and manner of production of the human voice or of different

METHOD AND APPARATUS FOR ENCRYPTING AREA OF ELECTRONIC DOCUMENT

CROSS-REFERENCE TO RELATED APPLICATION(S)

This application claims the benefit under 35 U.S.C. § 119(a) of a Korean patent application filed on Aug. 5, 2013, in the Korean Intellectual Property Office and assigned Serial No. 10-2013-0092664, the entire disclosure of which is hereby incorporated by reference.

TECHNICAL FIELD

The present disclosure relates to methods and apparatuses for encrypting an area of an electronic document. More particularly, the present disclosure relates to methods and apparatuses for setting an encrypted area based on a user input and displaying an area other than the encrypted area.

BACKGROUND

In general, there are two electronic document encrypting methods. In the first electronic document encrypting method, an access right for a document is set, and in the second electronic document encrypting method, the document is itself encrypted. In the first electronic document encrypting method, a password for authenticating an access right is stored in a header portion of a document, and whether a password input from a computer terminal is identical to the stored password is determined when the document is opened via an editor such as a word processor. When the input password is identical to the stored password, the document is opened. When the input password is not identical to the stored password, the document cannot be opened. The first electronic document encrypting method may be simply implemented. However, the first electronic document encrypting method has low security because the content of the document may be simply read by using a hacking tool when the password is not known.

The second electronic document encrypting method has high security because the content of the document is encrypted. However, it takes a considerable time to decrypt a large document using the second electronic document encrypting method. Also, if the password is forgotten or lost, there is a risk that the document may not be recoverable. Document encryption may be performed by an editor such as a word processor, and a separate utility program is widely used to encrypt a document file.

Since the related art electronic document encryption is applied to an entire document, this encryption is inefficient when encryption of only some area of the document is necessary. Also, since the entire document is encrypted, it takes considerable time to decrypt the encrypted document.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and apparatuses for encrypting an area of an electronic document and restricting an access right to prevent content of an encrypted area from being displayed. Another aspect of the present disclosure is to provide a foldable document display to demagnify and encrypt a document in an intuitive and simple manner. Also, another aspect of the present disclosure is to provide a memo function in a blank area generated according to a foldable document display.

Additional aspects will be set forth in part in the description which follows and, in part, will be apparent from the description, or may be learned by practice of the presented embodiments.

In accordance with an aspect of the present disclosure, a method for encrypting an area of an electronic document is provided. The method includes displaying the electronic document, receiving an input signal including information about a first point and a second point of the electronic document; shifting an area adjacent to the first point toward the second point in response to the input signal; displaying an area of the electronic document other than an encrypted area determined according to a result of the shifting; and enabling a lock mode that maintains a state of displaying the area other than the encrypted area.

The method may further include, in response to the input signal, generating a first area and a second area of the electronic document, which are divided by a boundary line between the first point and the second point of the electronic document, wherein the first area may be adjacent to and include the first point, and the second area may include the second point.

The displaying of the electronic document may include displaying content of the area other than the encrypted area.

The shifting of the area may include generating image data for displaying a document page object of the electronic document in a folded form when the first area shifts symmetrically with respect to the boundary line.

The shifting of the area may include generating image data for displaying a document page object of the electronic document in a folded form such that a first straight line passing through the first point meets with a second straight line passing through the second point in parallel to the first straight line.

The first point may be located within a predetermined range from a border of the document page object of the electronic document.

The input signal may indicate that an external input is a drag input for dragging the first point to the second point.

The displaying of the content of the area other than the encrypted area may include applying at least one of blanking, mosaicking, and blurring to the encrypted area.

The method may further include enabling a memo function in the first area.

The memo may include at least one of a note, a link, a remark, and a bookmark.

The method may further include: receiving authentication information for authenticating an access right to the encrypted area; performing an authentication process based on the authentication information; disabling the lock mode according to an authentication result; and displaying content of the electronic document in the encrypted area.

The method may further include, after the displaying of the content of the electronic document in the encrypted area, enabling the lock mode again.

In accordance with an aspect of the present disclosure, an apparatus for encrypting a portion of an electronic document is provided. The apparatus includes a display unit configured to display the electronic document; an input unit configured to receive an input signal including information about a first point and a second point of the electronic document; and a control unit configured to shift an area adjacent to the first point toward the second point in response to the input signal, control the display unit to display an area of the electronic document other than an encrypted area determined according to a result of the shift, and enable a lock mode that maintains a state of displaying the area other than the encrypted area.

The control unit may, in response to the input signal, generate a first area and a second area of the electronic document, which are divided by a boundary line between the first point and the second point of the electronic document, and the first area may be adjacent to and include the first point, and the second area may include the second point.

The display unit may display content of the area other than the encrypted area.

The control unit may generate image data for displaying a document page object of the electronic document in a folded form when the first area shifts symmetrically with respect to the boundary line.

The control unit may generate image data for displaying a document page object of the electronic document in a folded form such that a first straight line passing through the first point meets with a second straight line passing through the second point in parallel to the first straight line.

The input unit may receive a drag input for dragging the first point to the second point.

The control unit may apply at least one of blanking, mosaicking, and blurring to the encrypted area to control the display unit to display the content of the area other than the encrypted area among the content of the electronic document.

The control unit may enable a memo function in the first area.

The input unit may receive authentication information for authenticating an access right to the encrypted area, and the control unit may perform an authentication process based on the authentication information, disable the lock mode according to an authentication result, and control the display unit to display content of the electronic document in the encrypted area.

The control unit may, after the displaying of the content of the electronic document in the encrypted area, enable the lock mode.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which:

FIGS. 9 and 10 are diagrams illustrating an electronic document with a memo function enabled according to an embodiment of the present disclosure;

Throughout the drawings, it should be noted that like reference numbers are used to depict the same or similar elements, features, and structures

DETAILED DESCRIPTION

Figure 1:
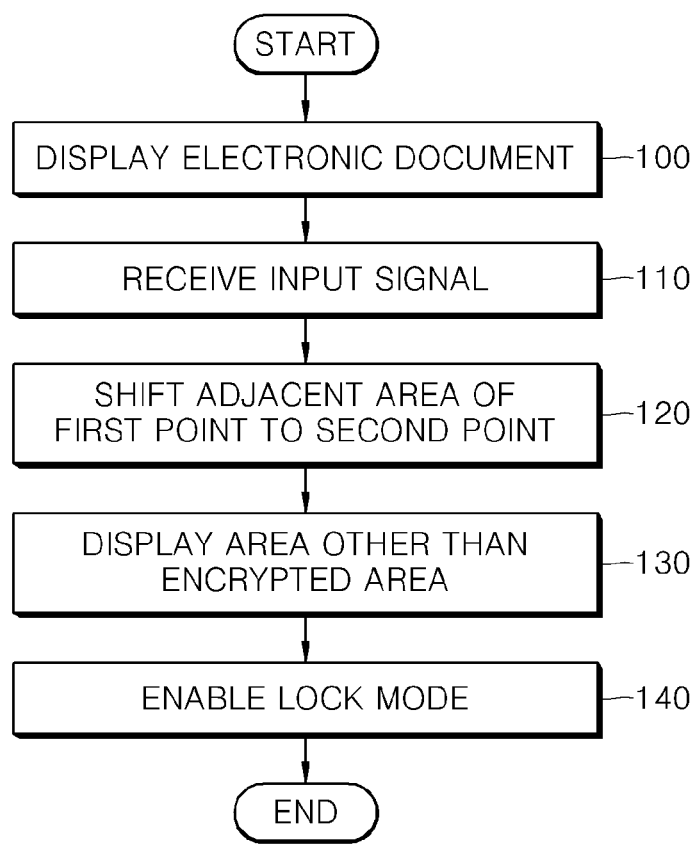
FIG. 1 is a flowchart illustrating a method for encrypting an area of an electronic document according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used herein will be described in brief prior to a detailed description of embodiments of the present disclosure.

As the terms used herein, so far as possible, general terms are selected in consideration of the functions in the present disclosure; however, these terms may vary according to the intentions of those skilled in the art, case precedents, or the appearance of new technology.

It will be understood that the terms "comprise", "include", and "have" specify the presence of stated elements, but do not preclude the presence or addition of other elements, unless otherwise defined. Also, the terms "unit" and "module" used herein refer to units for processing at least one function or operation, and may be implemented in hardware, software, or a combination thereof.

The term "touch input" refers to a user's gesture that is performed on a touchscreen to control a terminal. Examples of the touch input may include tap, touch & hold, double tap, drag, panning, flick, and drag & drop.

A "tap" refers to a user's operation of touching a screen very quickly with a finger or a touch tool (stylus). That is, a "tap" refers to a case where there is a small difference between a touch-in time point when a finger or a touch tool touches a screen and a touch-out time point when the finger or the touch tool is separated from the screen.

A "drag" refers to a user's operation of touching a screen with a finger or a touch tool and then shifting the finger or touch tool to another position on the screen while maintaining the touch. During a drag operation, an object is shifted, or a panning operation to be described later is performed.

A "panning" operation refers to a case where a user performs a drag operation without selecting an object. Since no object is selected during the "panning", a page shifts within a screen or an object group shifts within the page, instead of the object being shifting within the page.

A "flick" refers to a user's operation of dragging very quickly with a finger or a touch tool. A "drag (or panning)" and a "flick" may be discriminated based on whether a shift speed of the finger or the touch tool is higher than a predetermined speed.

A "drag & drop" refers to a user's operation of dragging and dropping an object to a predetermined position on a screen with a finger or a touch tool.

A "pinch" refers to a user's operation of shifting two fingers in different directions while touching the two fingers on a screen. As an example, the "pinch" is a gesture for magnifying (pinch open) or demagnifying (pinch close) a page, and a magnification value or a demagnification value is determined according to a distance between the two fingers.

A "document page object" refers to an object corresponding to each page constituting a document or a set of pages. In the following description, a "document page object" is represented as a two-dimensional (2D) object (for example, a rectangular object) referring to each page or a plurality of pages. The document page may be a portion of a document including images and characters, or may correspond to a window of an application program that is being executed in a computer, for example, a window of a word processor or a web browser. Also, the document page object may include some content or may be blank.

An apparatus described herein may be implemented in various types. For example, the apparatus described herein may be a mobile phone, a smart phone, a laptop computer, a tablet Personal Computer (PC), an electronic book (e-book) terminal, a digital broadcasting terminal, Personal Digital Assistant (PDA), or a Portable Multimedia Player (PMP), but is not limited thereto.

Embodiments of the present disclosure will be described below in detail with reference to the accompanying drawings so that those skilled in the art may implement the embodiments of the present disclosure. The present disclosure may, however, be embodied in many different forms and should not be construed as being limited to the embodiments set forth herein. In addition, known structures related to the description of the embodiments of the present disclosure will be omitted in the drawings for conciseness, and like reference numerals will denote like elements throughout the specification.

Hereinafter, embodiments of the present disclosure will be described in detail with reference to the accompanying drawings.

FIG. 1 is a flowchart illustrating a method for encrypting an area of an electronic document according to an embodiment of the present disclosure.

Referring to FIG. 1, in operation 100, the apparatus may display an electronic document, which refers to document-type data that is created in an electronic form by an apparatus with information processing capability, such as a computer, and is transmitted/received or stored. Also, the electronic document may include a document that is being created, as well as a document that has been created. Also, the electronic document may include a copy of a paper document, but is not limited thereto, and may include any image or document that is displayed. For example, the electronic document may also include a web page, a picture, and an application program such as a word processor or a web browser. Also, the document content may include any content. The electronic document may be displayed on a screen without being modified.

In operation 110, the apparatus may receive an input signal including information about a first point and a second point of the electronic document. The input signal may include a touch input, for example, a drag input, a flick input, or a tap input, but is not limited thereto. Inputs to the first point and the second point may be sequentially input, or may be input simultaneously with a pinch input.

According to an embodiment of the present disclosure, if the input signal is a mouse input, a mouse is clicked when a mouse cursor is located at the first point, and then the apparatus may receive a click input signal when the mouse cursor is located at the second point. Alternatively, the apparatus may receive an input signal corresponding to a drag & drop of the mouse cursor from the first point to the second point.

A screen of the apparatus according to an embodiment of the present disclosure may be a touchscreen having a touch interface. For example, when the user drags in a predetermined direction while touching the touchscreen with a finger or an electronic pen, a start point of a drag operation may be the first point and a point of a drop operation after completion of the drag operation may be the second point.

In response to the input signal, the apparatus may generate a first area and a second area of the electronic document that are divided by a boundary line between the first point and the second point. The first area may be adjacent to the first point and include the first point, and the second area may include the second point.

According to an embodiment of the present disclosure, the apparatus may determine a shift mode for shifting the first area to the second point. The shift mode according to an embodiment of the present disclosure may include a first shift mode and a second shift mode. This will be described later in detail with reference to FIG. 3.

In operation 120, the apparatus may shift an area adjacent to the first point to the second point. According to an embodiment of the present disclosure, the adjacent area may be the first area, but is not limited thereto. Also, a shift method may be a parallel shift method or a symmetrical shift method, but is not limited thereto. For example, referring to FIGS. 4A and 4B, an adjacent area 430 of a first point 400 may shift to a second point 410. As another example, referring to FIGS. 6A and 6B, an adjacent area 630 of a first point 600 may shift to a second point 610. This will be described later in detail with reference to FIGS. 4A to 7B.

In operation 130, the apparatus may display only an area of the electronic document other than an encrypted area determined according to a shift result. According to an embodiment of the present disclosure, the apparatus may display only content of the area other than the encrypted area.

According to an embodiment of the present disclosure, as a method of displaying only the area other than the encrypted area of the electronic document, the apparatus may apply at least one of blanking, mosaicking, and blurring to the encrypted area, but is not limited thereto.

In operation 140, the apparatus may enable a lock mode that maintains a state of displaying only the area other than the encrypted area.

According to an embodiment of the present disclosure, the apparatus may allocate a password to the encrypted area based on a user input in order to enable the lock mode. According to another embodiment of the present disclosure, the apparatus may use a pattern recognition mode to enable the lock mode, but is not limited thereto.

According to an embodiment of the present disclosure, the apparatus may apply a designated password to the entire electronic document. In this case, without needing to input a password to each of a plurality of encrypted areas in the electronic document, an area of the electronic document may be encrypted by an input button for encryption.

According to an embodiment of the present disclosure, the apparatus may designate a plurality of passwords for the entire electronic document and apply any one of the plurality of passwords. For example, the apparatus may apply a first password to a portion of the entire electronic document disclosed to a first user, apply a second password to a portion of disclosed to a second user, and disclose a portion other than the encrypted area to all users.

Figure 2:
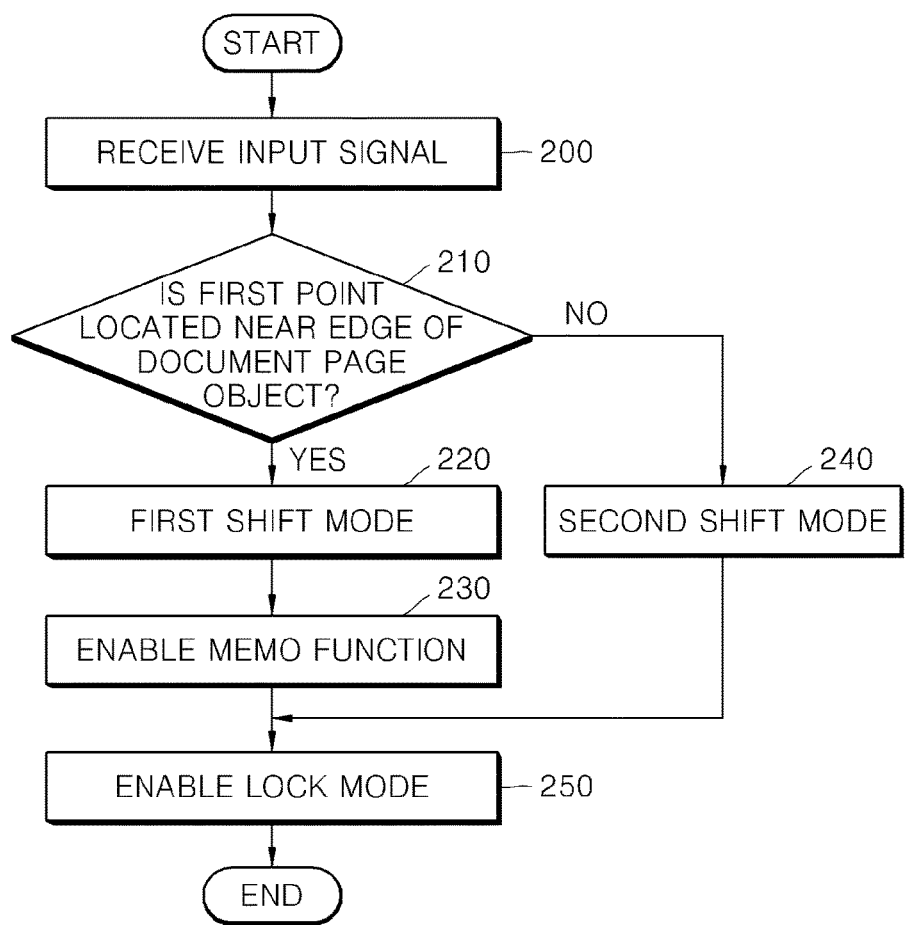
FIG. 2 is a flowchart illustrating an implementation of a shift mode according to an embodiment of the present disclosure.

FIG. 2 is a flowchart illustrating an implementation of a shift mode according to an embodiment of the present disclosure.

Referring to FIG. 2, in operation 200, the apparatus may receive an input signal including information about a first point and a second point of the electronic document. The input signal may include a touch input, for example, a drag input, a flick input, or a tap input, but is not limited thereto. Inputs to the first point and the second point may be sequentially input, or may be input simultaneously with a pinch input.

A screen of the apparatus according to an embodiment of the present disclosure may be a touchscreen having a touch interface. For example, when the user drags a portion in a predetermined direction while touching the portion on the touchscreen with a finger or an electronic pen, a start point of a drag operation may be the first point and a point of a drop operation after completion of the drag operation may be the second point.

In operation 210, the apparatus may determine a shift mode based on the position of the first point. For example, when the first point is located within a predetermined range from a border of a document page object of the electronic document, that is, when the first point is located near an edge of the document page object, the apparatus may determine a first shift mode, and may determine a second shift mode in other cases.

The first shift mode may refer to a mode in which a first area shifts symmetrically with respect to a boundary line. The apparatus may generate image data for displaying a document page object of the electronic document in a folded form when the first area shifts symmetrically with respect to the boundary line.

The second shift mode may refer to a mode in which the first area shifts such that a first straight line passing through the first point meets with a second straight line passing through the second point in parallel to the first straight line. The apparatus may generate image data for displaying a document page object of the electronic document in a folded form such that a first straight line passing through the first point meets with a second straight line passing through the second point in parallel to the first straight line.

According to another embodiment of the present disclosure, the apparatus may predetermine a shift mode based on a user input. Also, the shift mode may be predetermined by a default value.

In operation 220, the apparatus may perform the first shift mode when the first point is located near an edge of the document page object. The apparatus may generate image data for displaying a document page object of the electronic document in a folded form when the first area shifts symmetrically with respect to the boundary line. In the first shift mode, the encrypted area is determined as an area overlapping with the first area.

In operation 230, the apparatus may enable a memo function in the first area that has shifted symmetrically. According to an embodiment of the present disclosure, the memo may include at least one of a note, a link, a remark, and a bookmark. Therefore, without modifying the content of an original document, a memo may be input to the electronic document.

In operation 240, the apparatus may perform the second shift mode when the first point is not located near an edge of the document page object. Thus, the apparatus may generate image data for displaying a document page object of the electronic document in a folded form such that a first straight line passing through the first point meets with a second straight line passing through the second point in parallel to the first straight line. In the case of the second shift mode, the encrypted area is determined as an area between a first straight line passing through the first point and a second straight line passing through the second point in parallel to the first straight line.

In operation 250, the apparatus may enable a lock mode in the encrypted area. According to an embodiment of the present disclosure, the apparatus may allocate a password to the encrypted area based on a user input in order to enable the lock mode. According to another embodiment of the present disclosure, the apparatus may use a pattern recognition mode to enable the lock mode, but is not limited thereto.

According to an embodiment of the present disclosure, the apparatus may apply a designated password to the entire electronic document. In this case, without needing to input a password to each of a plurality of encrypted areas in the electronic document, some area of the electronic document may be encrypted by an input button for encryption.

According to an embodiment of the present disclosure, the apparatus may designate a plurality of passwords to the entire electronic document and apply any one of the plurality of passwords. For example, the apparatus may apply a first password to a portion of the entire electronic document disclosed to a first user, apply a second password to a portion of disclosed to a second user, and disclose a portion other than the encrypted area to all users.

Figure 3:
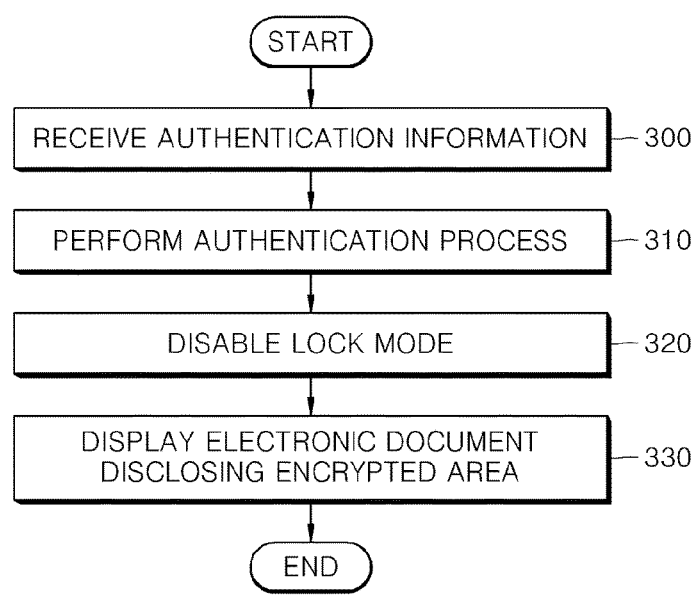
FIG. 3 is a flowchart illustrating disablement of a lock mode according to an embodiment of the present disclosure.

FIG. 3 is a flowchart illustrating disablement of a lock mode according to an embodiment of the present disclosure.

Referring to FIG. 3, in operation 300, the apparatus may receive authentication information for authenticating an access right to an encrypted area. When a user input is a password mode in order to enable a lock mode in the encrypted area, the authentication information may be a password that is input to disable the lock mode. When a pattern recognition mode is used to enable the lock mode, the authentication information may be a pattern input.

In operation 310, the apparatus may perform an authentication process based on the authentication information.

According to an embodiment of the present disclosure, when different passwords are allocated to encrypted areas of the electronic document, the apparatus may perform an authentication process on each of the encrypted areas. According to another embodiment of the present disclosure, when the same password is applied to the entire electronic document, the apparatus may perform one authentication process to disable the lock mode of the entire electronic document.

According to an embodiment of the present disclosure, when a password mode is used, the apparatus may determine whether a password received to enable the lock mode is identical to a password received as the authentication information to disable the lock mode. According to another embodiment of the present disclosure, based on the user input with respect to the entire electronic document, the apparatus may determine whether a predetermined password is identical to a password for the electronic document.

According to an embodiment of the present disclosure, when a pattern recognition mode is used, the apparatus may determine whether an input received to enable the lock mode is identical to an input received as to disable the lock mode. According to another embodiment of the present disclosure, based on the user input with respect to the entire electronic document, the apparatus may determine whether a predetermined pattern is identical to a pattern that was received as the authentication information.

In operation 320, the apparatus may disable the lock mode according to the result of the authentication process.

According to an embodiment of the present, when a password mode is used, the apparatus may disable the lock mode when the password received to enable the lock mode is identical to the password received as the authentication information to disable the lock mode. According to another embodiment of the present disclosure, based on the user input with respect to the entire electronic document, the apparatus may disable the lock mode when the predetermined password is identical to the password received as the authentication information.

According to an embodiment of the present disclosure, when a pattern recognition mode is used, the apparatus may disable the lock mode when the pattern input received to enable the lock mode is identical to the pattern input received as the authentication information to disable the lock mode. According to another embodiment of the present disclosure, based on the user input with respect to the entire electronic document, the apparatus may disable the lock mode when the predetermined pattern is identical to the password received as the authentication information.

According to an embodiment of the present disclosure, when an authentication process is performed on each of the encrypted areas, the lock mode may be disabled only in the encrypted area on which the authentication process has been performed. According to another embodiment of the present disclosure, when the same password is applied to the entire electronic document and the authentication process is performed to disable the lock mode of the entire electronic document, the apparatus may disable the lock mode of the entire encrypted areas to which the same password is applied.

According to an embodiment of the present disclosure, for example, when a first password and a second password are designated to the entire electronic document and the password received as the authentication information is identical to the first password, the apparatus may disable the lock mode in the entire encrypted area to which the first password is applied. In this case, the lock mode may be maintained in the encrypted area to which the second password is applied.

In operation 330, the apparatus may display the electronic document disclosing the encrypted area.

According to an embodiment of the present disclosure, the first area may disclose the encrypted area when the first area shifts in a direction opposite to the shift direction of the area adjacent to the first point in operation 120 of FIG. 1.

According to an embodiment of the present disclosure, when image data for displaying the document page object of the electronic document in a folded form has been generated in operation 120 of FIG. 1, image data may be generated for displaying the document page object in an unfolded form.

Also, according to an embodiment of the present disclosure, the apparatus may enable the lock mode again in the encrypted area that has been unlocked. That is, since the user has an access right to the encrypted area to disable the lock mode and read the electronic document with the encrypted area disclosed, the user may then enable the lock mode again in the unlocked encrypted area without setting a new encrypted area, thereby allowing the electronic document to be managed easily and efficiently.

Figure 4A:
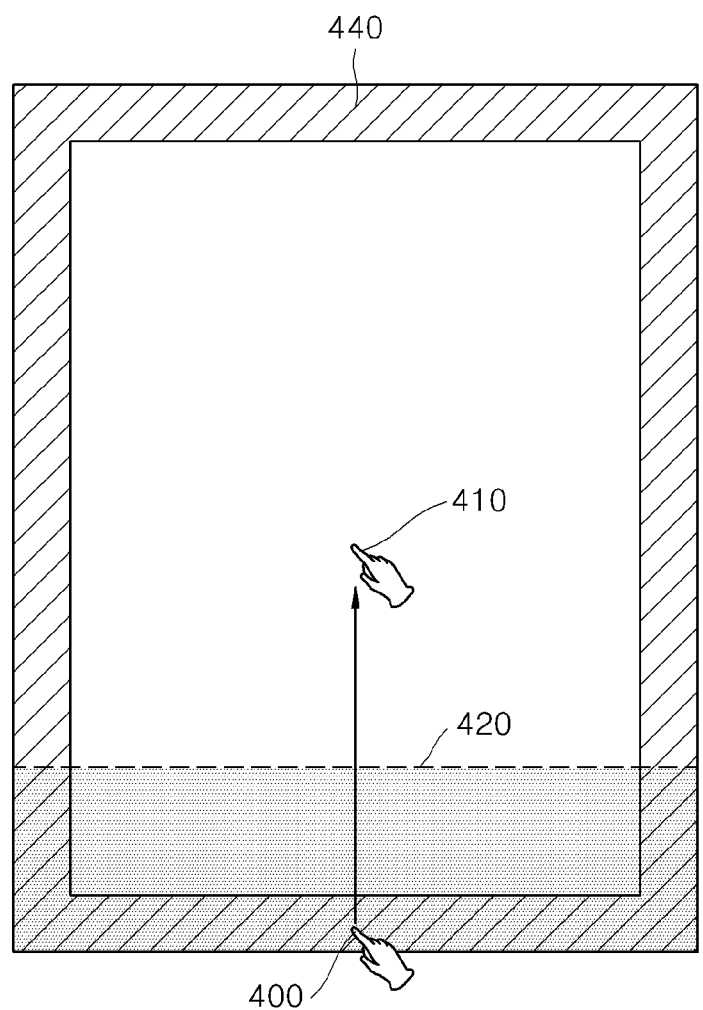
FIGS. 4A and 4B are diagrams illustrating a first shift mode according to an embodiment of the present disclosure.
Figure 4B:
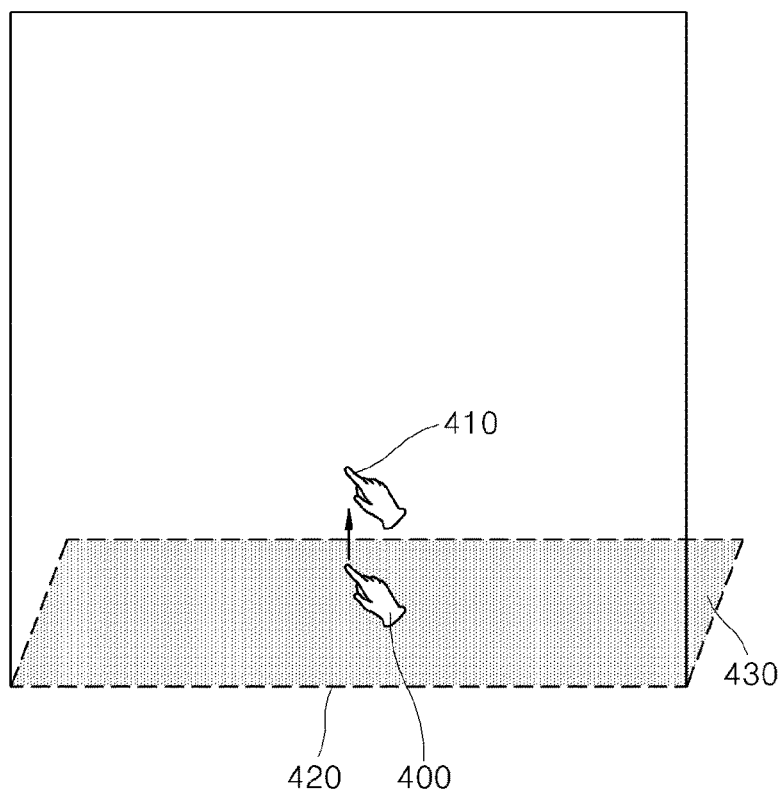

FIGS. 4A and 4B are diagrams illustrating a first shift mode according to an embodiment of the present disclosure.

Referring to FIG. 4A, based on a user input, the apparatus may receive an input signal including information about the positions of a first point 400 and a second point 410. According to an embodiment of the present disclosure, in a case where the apparatus determines a shift mode based on the position of the first point 400, the apparatus may determine to perform the first shift mode when the first point 400 is located within a predetermined range 440 from a border of the document page object of the electronic document.

Referring to FIG. 4B, a first area 430 shifts symmetrically with respect to a boundary line 420 between the first point 400 and the second point 410 of the electronic document. The apparatus may generate image data for displaying the document page object of the electronic document in a folded form when the first area 430 shifts symmetrically with respect to the boundary line 420. According to an embodiment of the present disclosure, when a drag & drop input mode is used, the apparatus may generate image data for displaying the document page object of the electronic document in a folded form when the first area 430 shifts in real time according to a drag input.

Figure 5A:
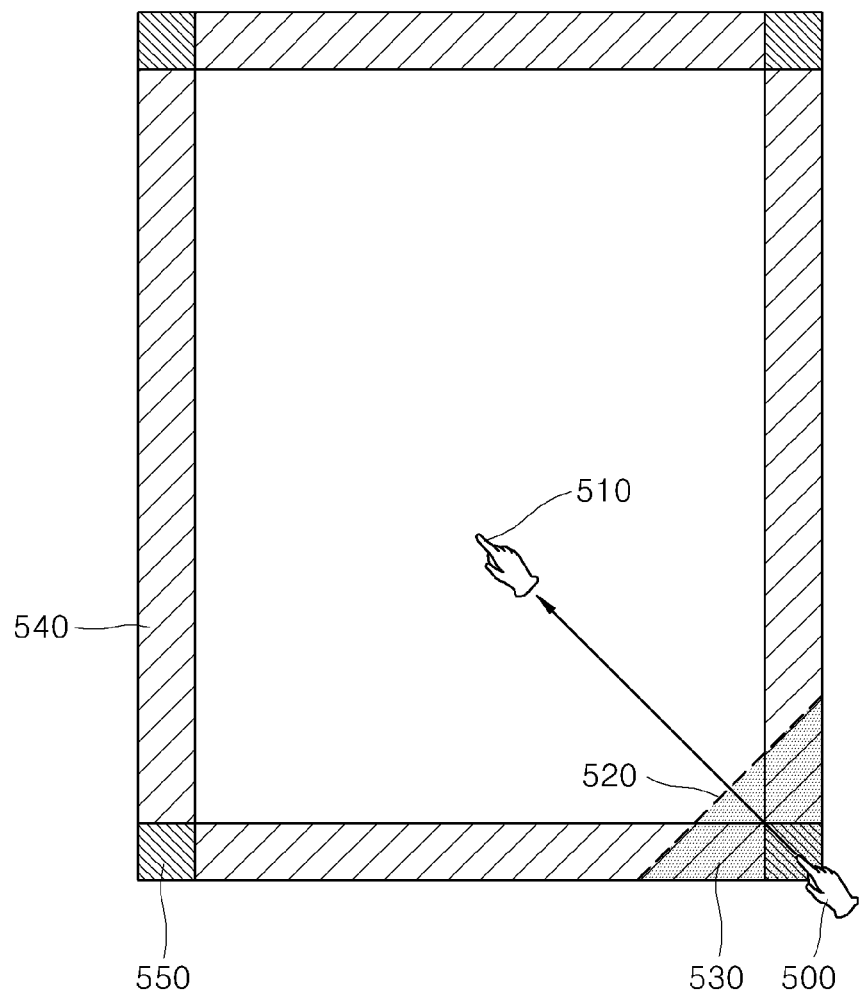
FIGS. 5A and 5B are diagrams illustrating a first shift mode according to an embodiment of the present disclosure.
Figure 5B:
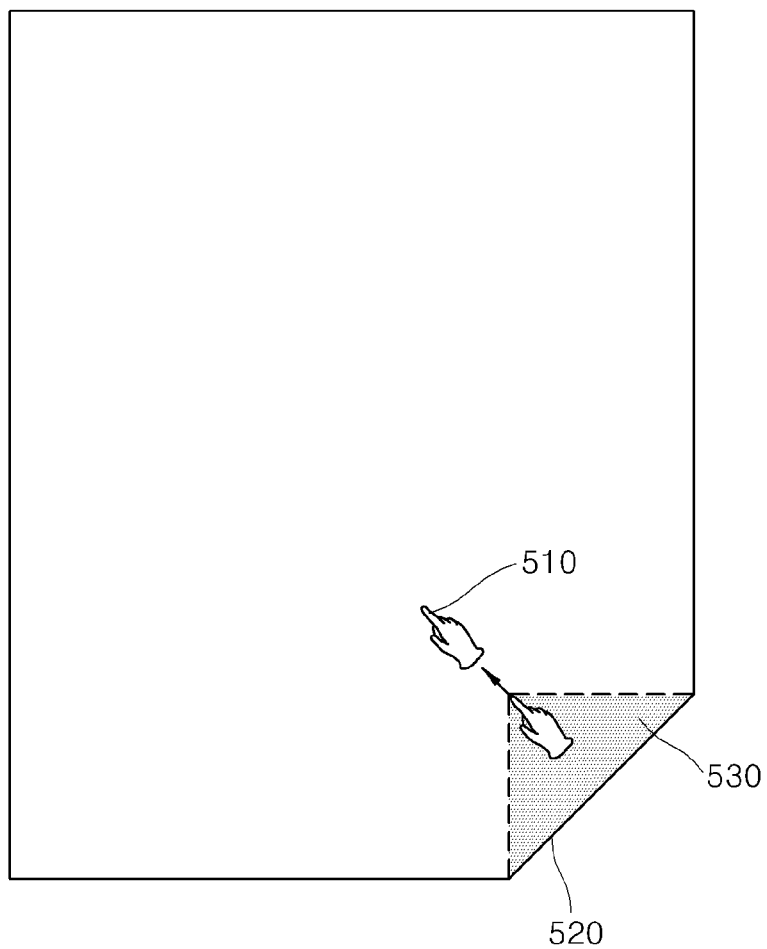

FIGS. 5A and 5B are diagrams illustrating a first shift mode according to an embodiment of the present disclosure.

Referring to FIG. 5A, based on a user input, the apparatus may receive an input signal including information about the positions of a first point 500 and a second point 510. According to an embodiment of the present disclosure, in a case where the apparatus determines a shift mode based on the position of the first point 500, the apparatus may determine to perform the first shift mode when the first point 500 is located within a predetermined range 540 from a border of the document page object of the electronic document. In particular, when the first point 500 is located within a predetermined range 550 from a vertex or a corner of the document page object, the apparatus may generate image data for displaying the document page object in a diagonally folded form.

Referring to FIG. 5B, a first area 530 may shift symmetrically with respect to a boundary line 520 between the first point 500 and the second point 510 of the electronic document. According to an embodiment of the present disclosure, the boundary line 520 may be a perpendicular bisector of a line connecting the first point 500 and the second point 510. Also, when a drag & drop input mode is used, the apparatus may generate image data for displaying the document page object of the electronic document in a folded form when the first area 530 shifts in real time according to a drag input. That is, the apparatus may generate image data for displaying the document object page in a folded form such that the shift direction of the first area 530 is perpendicular to the direction of the boundary line 520.

Figure 6A:
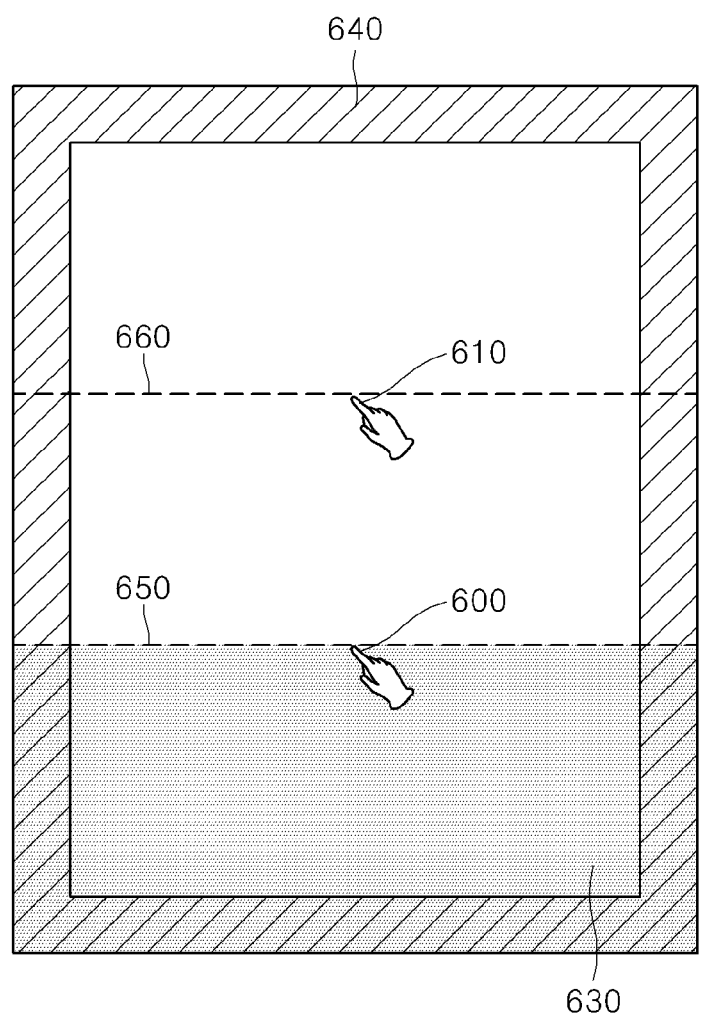
FIGS. 6A and 6B are diagrams illustrating a second shift mode according to an embodiment of the present disclosure.
Figure 6B:
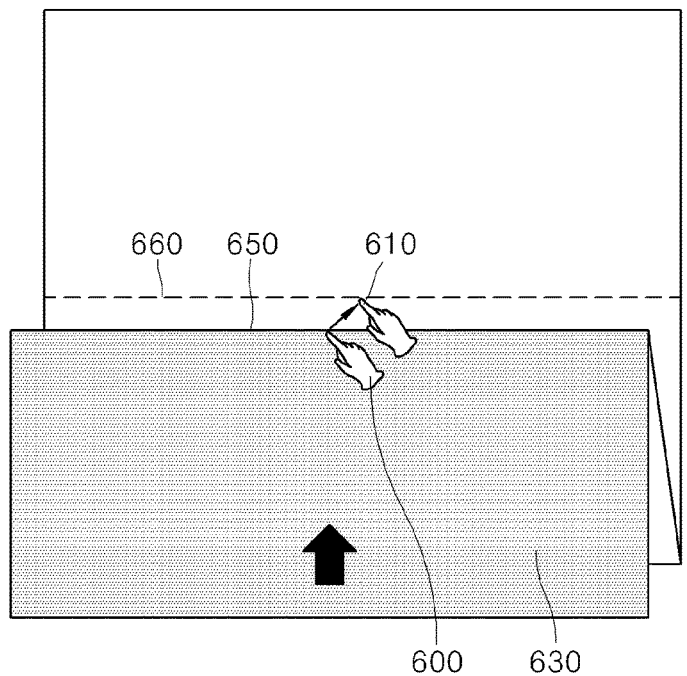

FIGS. 6A and 6B are diagrams illustrating a second shift mode according to an embodiment of the present disclosure.

Referring to FIG. 6A, based on a user input, the apparatus may receive an input signal including information about the positions of a first point 600 and a second point 610. According to an embodiment of the present disclosure, in a case where the apparatus determines a shift mode based on the position of the first point 600, the apparatus may determine to perform the second shift mode when the first point 600 is located within a predetermined range 640 from a border of the document page object of the electronic document.

Referring to FIG. 6B, a first area 630 may shift to the second point 610, and the apparatus may generate image data for displaying the document page object in a folded form such that a first straight line 650 passing through the first point 600 meets with a second straight line 660 passing through the second point 610 in parallel to the first straight line 650. According to an embodiment of the present disclosure, when a drag & drop input mode is used, the apparatus may generate image data for displaying the document page object in a folded form when the first area 630 shifts in real time according to a drag input.

Figure 7A:
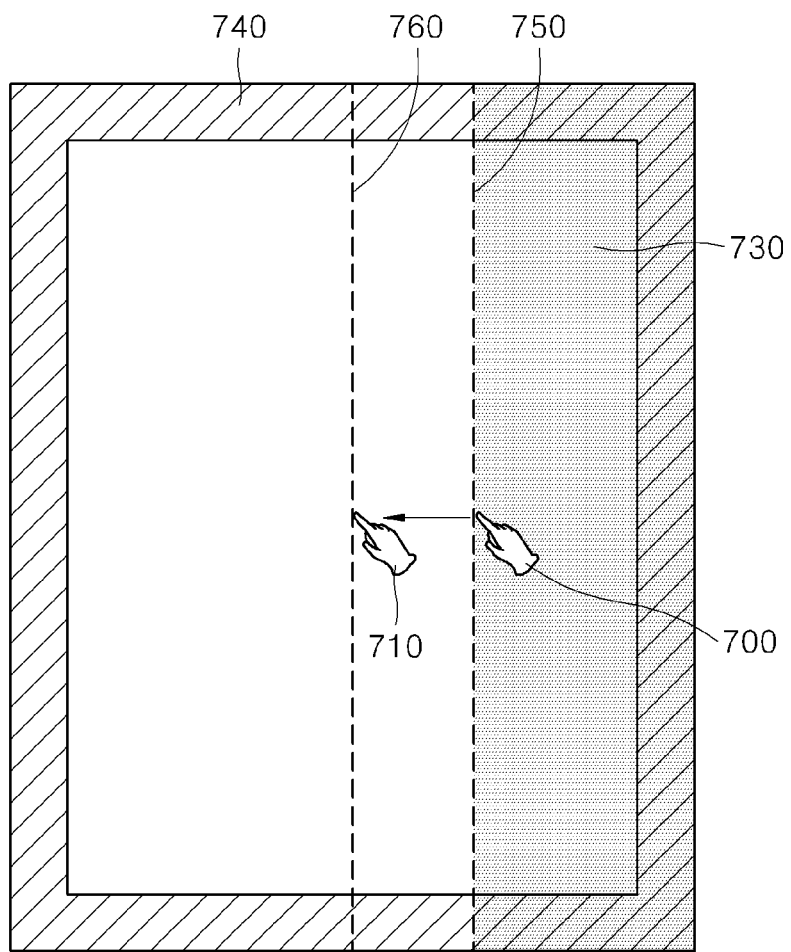
FIGS. 7A and 7B are diagrams illustrating a second shift mode according to an embodiment of the present disclosure.
Figure 7B:
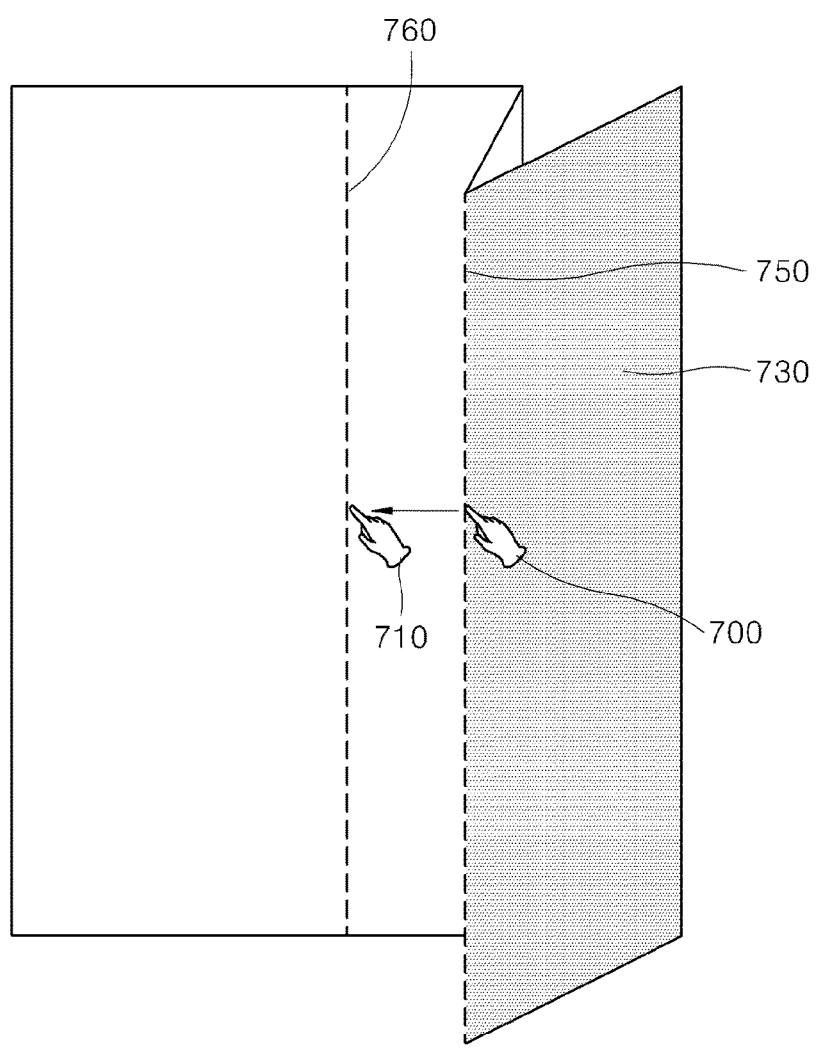

FIGS. 7A and 7B are diagrams illustrating a second shift mode according to an embodiment of the present disclosure.

Referring to FIG. 7A, based on a user input, the apparatus may receive an input signal including information about the positions of a first point 700 and a second point 710. According to an embodiment of the present disclosure, in a case where the apparatus determines a shift mode based on the position of the first point 700, the apparatus may determine to perform the second shift mode when the first point 700 is located within a predetermined range 740 from a border of the document page object of the electronic document. In particular, when an angle difference between a horizontal line and a line connecting the first point 700 and the second point 710 is within a predetermined value, a first straight line 750 may be generated in the vertical direction.

Referring to FIG. 7B, a first area 730 may shift to the second point 710, and the apparatus may generate image data for displaying the document page object in a folded form such that a first straight line 750 passing through the first point 700 meets with a second straight line 760 passing through the second point 710 in parallel to the first straight line 750. According to an embodiment of the present disclosure, when a drag & drop input mode is used, the apparatus may generate image data for displaying the document page object in a folded form when the first area 730 shifts in real time according to a drag input.

Figure 8A:
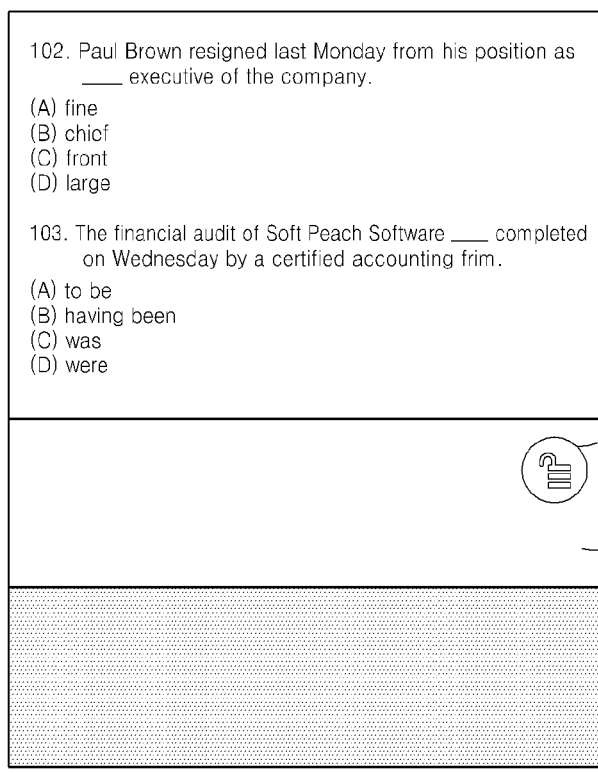
FIGS. 8A, 8B, and 8C are diagrams illustrating an electronic document with a lock mode enabled according to an embodiment of the present disclosure.
Figure 8B:
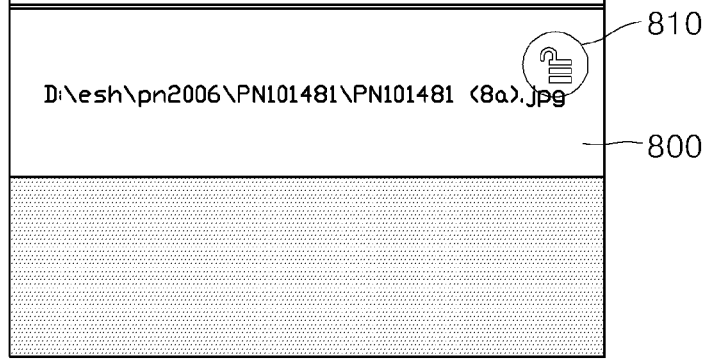
Figure 8C:
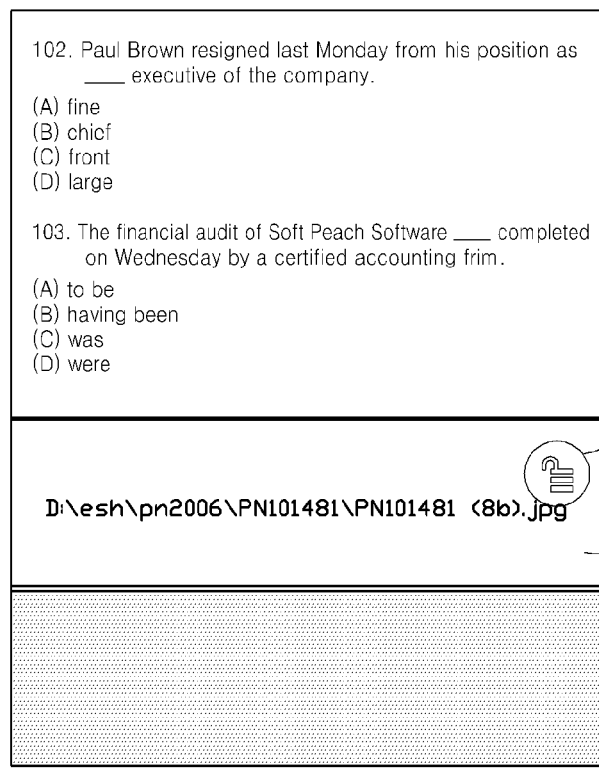

FIGS. 8A, 8B, and 8C are diagrams illustrating an electronic document with a lock mode enabled according to an embodiment of the present disclosure.

Referring to FIG. 8A, according to an embodiment of the present disclosure, an encrypted area 800 may be blank and an icon 810 indicating the enablement of the lock mode may be displayed.

Referring to FIG. 8B, according to an embodiment of the present disclosure, the encrypted area 800 may be mosaicked, and the icon 810 indicating the enablement of the lock mode may be displayed.

Referring to FIG. 8C, according to an embodiment of the present disclosure, the encrypted area 800 may be blurred, and the icon 810 indicating the enablement of the lock mode may be displayed.

FIGS. 9 and 10 are diagrams illustrating electronic documents with a memo function enabled according to an embodiment of the present disclosure.

Referring to FIGS. 9 and 10, in the case of the first shift mode, the apparatus may enable a memo function in first areas 900 and 1000, respectively. According to an embodiment of the present disclosure, the memo may include at least one of a note, a link, a remark, and a bookmark. Therefore, without modifying the content of an original document, a memo may be input to the electronic document.

As illustrated in FIGS. 9 and 10, the apparatus may also enable the lock mode displayed as icons 910 and 1010, respectively, based on a user input after the shift of the electronic document to the first shift mode. Also, when a first area shifts symmetrically with respect to a boundary line between a first point and a second point, a new blank area may be generated in the first areas 900 and 1000 that has shifted symmetrically. The apparatus may enable a memo function in the first areas 900 and 1000, and the user may input a memo (for example, a text) to the first areas 900 and 1000. The memo input to the first areas 900 and 1000 may be disclosed to all users.

According to an embodiment of the present disclosure, when an access right to the encrypted area is authenticated and the lock mode is disabled, the encrypted area of the electronic document may be disclosed. When the encrypted area is disclosed, the first areas 900 and 1000 with the memo input may not be displayed on a display unit of the apparatus. The electronic document may include a memo access button for accessing the memo when the lock mode is disabled. When the user selects (for example, clicks) the memo access button, the apparatus may display a new window disclosing the content of the memo input to the first areas 900 and 1000, respectively, in a predetermined area of the screen.

Figure 11A:
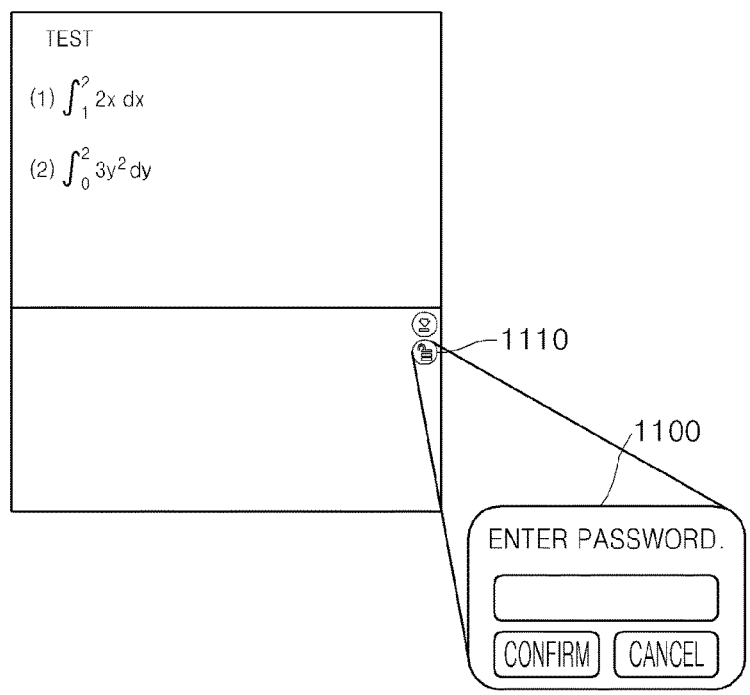
FIGS. 11A, 11B, and 11C are diagrams illustrating disablement of a lock mode according to an embodiment of the present.
Figure 11B:
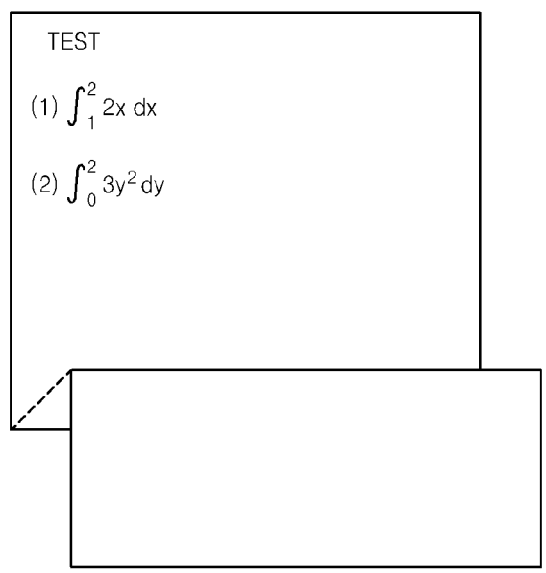
Figure 11C:
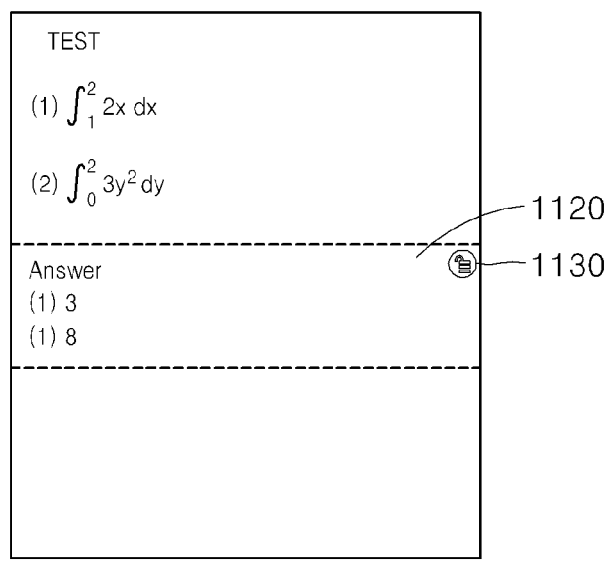

FIGS. 11A, 11B, and 11C are diagrams illustrating disablement of a lock mode according to an embodiment of the present disclosure.

Referring to FIG. 11A, the lock mode of the electronic document may be disabled after the shift to the second shift mode. The apparatus may display an input window 1100 for receiving an input of authentication information. According to an embodiment of the present disclosure, when the user taps a button 1110 for a lock mode disablement, the input window 1100 for receiving an input of authentication information may be displayed and the user may input authentication information to the input window 1100.

Referring to FIG. 11B, the apparatus may disable the lock mode when the access right is authenticated according to the result of an authentication process. According to an embodiment of the present disclosure, the first area shifts in a direction opposite to the shift direction of the first area during the encryption operation, thereby disclosing the encrypted area. Also, when image data for displaying the document page object of the electronic document in a folded form has been generated, image data for displaying the document page object in an unfolded form may be generated.

Referring to FIG. 11C, the apparatus may display the electronic document disclosing an encrypted area 1120. According to an embodiment of the present disclosure, the apparatus may display an input button 1130 for enabling the lock mode in the encrypted area 1120.

Figure 12:
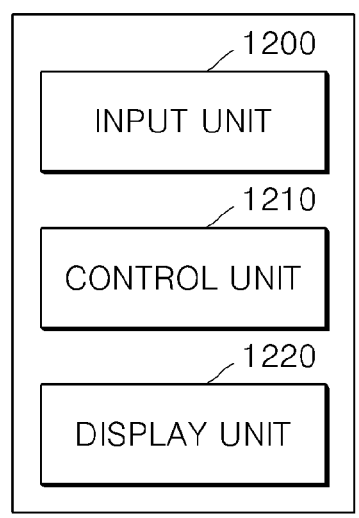
FIG. 12 is a block diagram illustrating an apparatus according to an embodiment of the present disclosure.

FIG. 12 is a block diagram illustrating a configuration of the apparatus according to an embodiment of the present disclosure.

Referring to FIG. 12, the apparatus may include an input unit 1200, a control unit 1210, and a display unit 1220. However, the apparatus may include more or less components than the illustrated components.

The above components will be described below.

The input unit 1200 allows the user to input data for controlling the apparatus. According to an embodiment of the present disclosure, the input unit 1200 may include a keypad, a mouse, a dome switch, a touch pad (for example, a capacitive overlay type, a resistive overlay type, an infrared beam type, a surface acoustic wave type, an integral strain gauge type, or a piezoelectric type), a jog wheel, and a jog switch, for example. In particular, when a touch pad forms a mutual layer structure with the display unit 1220, the input unit 1200 may be referred to as a touchscreen.

The input unit 1200 may receive a user's gesture (for example, a drag gesture, a tap gesture, or a flick gesture) on a screen (or a page displayed on a screen). Also, the input unit 1200 may receive a user's pinch input on a screen (or a page displayed on a screen).

According to an embodiment of the present disclosure, the input unit 1200 may receive an input signal including information about a first point and a second point of an electronic document.

The control unit 1210 controls an overall operation of the apparatus. For example, the control unit 1210 may control the input unit 1200, the display unit 1220, and a memory (not illustrated).

The control unit 1210 may determine a shift mode. According to an embodiment of the present disclosure, the shift mode may include a first shift mode and a second shift mode. Therefore, when a user input (for example, a drag input) is received, the control unit 1210 may determine whether a preset mode is the first shift mode or the second shift mode. When the shift mode is not preset, the apparatus may determine the shift mode based on the position of the first point, however, the embodiments of the present disclosure are not limited thereto.

The control unit 1210 may shift an adjacent area of the first point to the second point in response to the input signal. According to an embodiment of the present disclosure, the control unit 1210 may generate a first area and a second area of the electronic document that are divided by a boundary line between the first point and the second point of the electronic document, and shift the first area to the second point.

The control unit 1210 may display an area other than an encrypted area. According to an embodiment of the present disclosure, the control unit 1210 may control the display unit 1220 to display only the content of the area other than the encrypted area that was determined according to the shift result. Also, the control unit 1210 may enable a lock mode that displays the area other than the encrypted area.

When the shift mode is the first shift mode, the control unit 1210 may enable a memo function in the first area. The memo may include at least one of a note, a link, a remark, and a bookmark.

The control unit 1210 may perform an authentication process for authenticating an access right to the encrypted area. Also, the control unit 1210 may disable the lock mode according to the authentication result, and control the display unit 1220 to display the encrypted area of the electronic document. According to an embodiment of the present disclosure, the control unit 1210 may enable the lock mode again in the encrypted area.

The display unit 1220 may display information processed in the apparatus. For example, the display unit 1220 may display the electronic document on a screen.

According to an embodiment of the present disclosure, the display unit 1220 includes a touchscreen with a layer structure of a touch pad and the display unit 1220 may be used as an input device in addition to an output device. The display unit 1220 may include at least one of a liquid crystal display, a thin film transistor liquid crystal display, an organic light-emitting diode, a flexible display, a three-dimensional (3D) display, and an electrophoretic display.

The touchscreen may be configured to detect a touch input pressure as well as a touch input position and a touch area. Also, the touchscreen may be configured to detect a proximity touch as well as the real touch.

Although not illustrated, various sensors may be provided in or near the touchscreen to sense a proximity touch or a touch to the touchscreen. An example of the sensor for sensing a touch to the touchscreen is a tactile sensor.

The tactile sensor refers to a sensor that senses a touch of an object in the degree of a human sense or more. The tactile sensor may detect a variety of information, such as the roughness of a touch surface, the hardness of a touch object, and the temperature of a touch point.

The display unit 1220 may display a shift of an adjacent area of the first point to the second point in response to the input signal. According to an embodiment of the present disclosure, the display unit 1220 may display a shift of the first area to the second point according to the determined shift mode.

For example, when the determined shift mode is the first shift mode, the display unit 1220 may display the document page object in a folded form when the first area shifts symmetrically with respect to the boundary line. According to an embodiment of the present disclosure, when a drag & drop input mode is used, the display unit 1220 may display the document page object of the electronic document in a folded form according to a drag input.

Also, when the determined shift mode is the second shift mode, the display unit 1220 may display the document page object in a folded form such that the first straight line passing through the first point meets with the second straight line passing through the second point in parallel to the first straight line. According to an embodiment of the present disclosure, when a drag & drop input mode is used, the display unit 1220 may display the document page object of the electronic document in a folded form according to a drag input.

The display unit 1220 may display the content other than the encrypted area determined according to the shift result. The display unit 1220 may display an icon indicating the enablement of the lock mode in the encrypted area. Also, the display unit 1220 may display a button for a lock mode disablement. According to an embodiment of the present disclosure, when the user taps the button, an input window for receiving an input of authentication information may be displayed.

When the lock mode is disabled, the display unit 1220 may display the encrypted area of the electronic document. According to an embodiment of the present disclosure, the display unit 1220 may disclose the encrypted area when the first area shifts in a direction opposite to the shift direction of the first area during the encryption operation. Also, when image data for displaying the document page object of the electronic document in a folded form has been generated, image data for displaying the document page object in an unfolded form may be generated.

The apparatus may further include a memory (not illustrated). The memory (not illustrated) may store a program for processing and control of the control unit 1210, and may temporarily store input/output data.

Examples of the memory (not illustrated) may include at least one type of storage medium among flash memory type, hard disk type, multimedia card micro type, card type memory (e.g., SD and XD memories), Random Access Memory (RAM), Static Random Access Memory (SRAM), Read-Only Memory (ROM), Electronically Erasable Programmable Read-Only Memory (EEPROM), Programmable Read-Only Memory (PROM), magnetic memory, magnetic disk, and optical disk. Also, the apparatus may operate a web storage that performs a storage function of the memory (not illustrated) on the Internet.

The embodiments of the present disclosure may also be implemented in the form of a computer-readable recording medium including instructions executable by a computer, such as a program module executed by a computer. The computer-readable recording medium may be any available medium accessible by computers, examples of which may include a volatile recording medium, a nonvolatile recording medium, a removable recording medium, and an unremovable recording medium. Examples of the computer-readable medium may also include a computer storage medium and a communication medium. Examples of the computer storage medium may include a volatile storage medium, a nonvolatile storage medium, a removable storage medium, and an unremovable storage medium that are implemented by any method or technology to store information such as computer-readable instructions, data structures, program modules, or other data. Examples of the communication medium may include any information transmission medium including computer-readable instructions, data structures, program modules, other data of modulated data signals, or other transmission mechanisms.

The foregoing is illustrative of various embodiments and is not to be construed as limiting thereof. Although the various embodiments have been described above, those or ordinary skill in the art will readily appreciate that various modifications are possible in the various embodiments without materially departing from the concepts and features of the various embodiments. Therefore, it is to be understood that the various embodiment described above should be considered in descriptive sense only and not for purposes of limitation. For example, the components described as being combined may also be implemented in a distributed manner, and the components described as being distributed may also be implemented in a combined manner.

It should be understood that the various embodiments described herein are descriptive only and not for purposes of limitation. Descriptions of features or aspects within each embodiment should typically be considered as available for other similar features or aspects in other embodiments.

While the present disclosure have been shown and described with reference to various embodiments thereof, it will be understood by those of ordinary skilled in the art that various changes in form and details may be made therein without departing from the spirit and scope of the present disclosure as defined by the appended claims and their equivalents.

What is claimed is:

1. A method for encrypting a portion of an electronic document implemented using a hardware processor, the method comprising:
    displaying by the hardware processor the electronic document;
    receiving an input signal comprising information about a first point and a second point of the electronic document;
    determining a shift mode as a first shift mode or a second shift mode based on whether the first point is located within a predetermined range from a border of the document page object of the electronic document;
    shifting a first area of the electronic document adjacent to the first point toward the second point based on the determined shift mode;
    displaying a second area of the electronic document other than an encrypted area determined according to a result of the shifting;
    enabling a lock mode that maintains a state of displaying the second area other than the encrypted area; and
    when an access right to the encrypted area is authenticated and the lock mode is disabled, displaying the encrypted area by shifting the first area again in a direction opposite a shift direction of the first area,
    wherein the first shift mode is a mode in which the first area is shifted symmetrically with respect to a boundary line, and the second shift mode is a mode in which the first area is shifted such that a first straight line passing through the first point meets a second straight line passing through the second point in parallel to the first straight line.

2. The method of claim 1, further comprising, in response to the input signal, generating the first area and the second area of the electronic document, which are divided by a boundary line between the first point and the second point of the electronic document,
    wherein the first area is adjacent to and includes the first point, and the second area includes the second point.

3. The method of claim 1, wherein the displaying of the electronic document comprises displaying content of the area other than the encrypted area.

4. The method of claim 2, wherein the shifting of the area comprises generating image data for displaying a document page object of the electronic document in a folded form when the first area shifts symmetrically with respect to the boundary line.

5. The method of claim 1, wherein the shifting of the area comprises generating image data for displaying a document page object of the electronic document in a folded form such that a first straight line passing through the first point meets with a second straight line passing through the second point in parallel to the first straight line.

6. The method of claim 4, wherein the first point is located within a predetermined range from a border of the document page object of the electronic document.

7. The method of claim 1, wherein the input signal indicates that an external input is a drag input for dragging the first point to the second point.

8. The method of claim 3, wherein the displaying of the content of the area other than the encrypted area comprises applying at least one of blanking, mosaicking, or blurring to the encrypted area.

9. The method of claim 4, further comprising enabling a memo function in the first area.

10. The method of claim 9, wherein the memo comprises at least one of a note, a link, a remark, or a bookmark.

11. The method of claim 1, further comprising:
receiving authentication information for authenticating an access right to the encrypted area;
performing an authentication process based on the authentication information;
disabling the lock mode according to an authentication result; and
displaying content of the electronic document in the encrypted area.

12. The method of claim 11, further comprising, after the displaying of the content of the electronic document in the encrypted area, enabling the lock mode.

13. A non-transitory computer-readable recording medium that stores a program, executable by a computer, to cause the computer to:
display an electronic document on a display device;
receive an input signal comprising information about a first point and a second point of the electronic document;
determine a shift mode as a first shift mode or a second shift mode based on whether the first point is located within a predetermined range from a border of the document page object of the electronic document;
shift a first area of the electronic document adjacent to the first point toward the second point in response to the input signal based on the determined shift mode;
display on the display device a second area of the electronic document other than an encrypted area determined according to a result of the shifting;
enable a lock mode that maintains a state of displaying the second area other than the encrypted area on the display device; and
when an access right to the encrypted area is authenticated and the lock mode is disabled, display on the display device the encrypted area by shifting the first area again in a direction opposite a shift direction of the first area,
wherein the first shift mode is a mode in which the first area is shifted symmetrically with respect to a boundary line, and the second shift mode is a mode in which the first area is shifted such that a first straight line passing through the first point meets a second straight line passing through the second point in parallel to the first straight line.

14. An apparatus for encrypting a portion of an electronic document, the apparatus comprising:
a display device configured to display the electronic document;
an input device; and
a hardware processor configured to:
control the input device to receive an input signal comprising information about a first point and a second point of the electronic document,
determine a shift mode as a first shift mode or a second shift mode based on whether the first point is located within a predetermined range from a border of the document page object of the electronic document,
shift a first area of the electronic document adjacent to the first point toward the second point based on the determined shift mode,
control the display device to display a second area of the electronic document other than an encrypted area determined according to a result of the shifting,
enable a lock mode that maintains a state of displaying the second area other than the encrypted area, and
when an access right to the encrypted area is authenticated and the lock mode is disabled, display the encrypted area by shifting the first area again in a direction opposite a shift direction of the first area,
wherein the first shift mode is a mode in which the first area is shifted symmetrically with respect to a boundary line, and the second shift mode is a mode in which the first area is shifted such that a first straight line passing through the first point meets a second straight line passing through the second point in parallel to the first straight line.

15. The apparatus of claim 14,
wherein the hardware processor, in response to the input signal, is further configured to generate the first area and the second area of the electronic document, which are divided by a boundary line between the first point and the second point of the electronic document, and
wherein the first area is adjacent to and includes the first point, and the second area includes the second point.

16. The apparatus of claim 14, wherein the display device is further configured to display content of the area other than the encrypted area.

17. The apparatus of claim 15, wherein the hardware processor is further configured to generate image data for displaying a document page object of the electronic document in a folded form when the first area shifts symmetrically with respect to the boundary line.

18. The apparatus of claim 14, wherein the hardware processor is further configured to generate image data for displaying a document page object of the electronic document in a folded form such that a first straight line passing through the first point meets with a second straight line passing through the second point in parallel to the first straight line.

19. The apparatus of claim 16, wherein the hardware processor is further configured to apply at least one of blanking, mosaicking, or blurring to the encrypted area to control the display device to display the content of the area other than the encrypted area among the content of the electronic document.

20. The apparatus of claim 14,
wherein the input device is further configured to receive authentication information for authenticating an access right to the encrypted area, and
wherein the hardware processor is further configured to:
perform an authentication process based on the authentication information,
disable the lock mode according to an authentication result, and
control the display device to display content of the electronic document in the encrypted area.

* * * * *